(12) United States Patent
Kim et al.

(10) Patent No.: US 11,366,355 B2
(45) Date of Patent: Jun. 21, 2022

(54) DIRECT TYPE BACK LIGHT DEVICE AND DISPLAY APPARATUS HAVING THE SAME

(71) Applicant: SAMSUNG ELECTRONICS CO., LTD., Suwon-si (KR)

(72) Inventors: Jongbin Kim, Suwon-si (KR); Hyungsuk Kim, Suwon-si (KR); Youngmin Lee, Suwon-si (KR); Dukjin Jeon, Suwon-si (KR); Byoungjin Cho, Suwon-si (KR); Sukju Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/926,131

(22) Filed: Jul. 10, 2020

(65) Prior Publication Data

US 2021/0116750 A1   Apr. 22, 2021

(30) Foreign Application Priority Data

Oct. 21, 2019   (KR) .......................... 10-2019-0130989

(51) Int. Cl.
*G02F 1/13357*   (2006.01)
(52) U.S. Cl.
CPC .. *G02F 1/133603* (2013.01); *G02F 1/133605* (2013.01); *G02F 1/133606* (2013.01)
(58) Field of Classification Search
CPC ........ G02F 1/133603; G02F 1/133605; H05K 2201/2054
See application file for complete search history.

(56) References Cited

U.S. PATENT DOCUMENTS

| 8,305,516 | B2 | 11/2012 | Cho et al. |
| 9,482,899 | B2 | 11/2016 | Lee et al. |
| 9,612,474 | B2 | 4/2017 | Song |
| 2006/0291254 | A1 | 12/2006 | Jeong et al. |
| 2009/0095969 | A1 | 4/2009 | Kotani et al. |
| 2010/0165240 | A1 | 7/2010 | Cho et al. |

(Continued)

FOREIGN PATENT DOCUMENTS

| KR | 10-0933450 B1 | 12/2009 |
| KR | 20120051855 A | * 5/2012 |

(Continued)

OTHER PUBLICATIONS

Communication dated Jan. 27, 2021, issued by the European Patent Office in European Application No. 20188760.1.

(Continued)

*Primary Examiner* — Erin Kryukova
(74) *Attorney, Agent, or Firm* — Sughrue Mion, PLLC (57) ABSTRACT

A direct type backlight device includes a lower chassis, a reflective sheet disposed on a bottom portion of the lower chassis, and a plurality of light emitting diode (LED) bars disposed on an upper surface of the reflective sheet. Each of the plurality of LED bars includes a bar-shaped printed circuit board disposed on the upper surface of the reflective sheet, a plurality of LEDs disposed on an upper surface of the printed circuit board, and a reflective member provided on the upper surface of the printed circuit board. A reflectance of the reflective member is at least 90% of a reflectance of the reflective sheet.

4 Claims, 10 Drawing Sheets

(56) References Cited

U.S. PATENT DOCUMENTS

| | | | |
|---|---|---|---|
| 2014/0240978 A1* | 8/2014 | Kim | F21V 15/01 |
| | | | 362/235 |
| 2015/0131264 A1 | 5/2015 | Ishizuka | |
| 2016/0011461 A1* | 1/2016 | Kim | G02F 1/133608 |
| | | | 349/64 |
| 2017/0255059 A1* | 9/2017 | Ishizuka | G02F 1/133605 |
| 2020/0012154 A1* | 1/2020 | Watanabe | G02F 1/133609 |
| 2020/0183234 A1* | 6/2020 | Kim | G02F 1/133611 |

FOREIGN PATENT DOCUMENTS

| | | | |
|---|---|---|---|
| KR | 10-2012-0057726 A | | 6/2012 |
| KR | 20120057726 A | * | 6/2012 |
| KR | 10-2012-0094757 A | | 8/2012 |
| KR | 10-1308752 B1 | | 9/2013 |
| KR | 10-2007-0000639 A | | 8/2015 |
| KR | 10-2015-0090693 A | | 8/2015 |
| KR | 10-2015-0097888 A | | 8/2015 |
| KR | 10-1678337 B1 | | 11/2016 |
| KR | 10-1797279 B1 | | 12/2017 |
| KR | 10-2018-0036216 A | | 4/2018 |
| KR | 10-2127967 B1 | | 6/2020 |

OTHER PUBLICATIONS

International Search Report (PCT/ISA/210) dated Jan. 20, 2021 issued by the International Searching Authority in International Application No. PCT/KR2020/013903.

Written Opinion (PCT/ISA/237) dated Jan. 20, 2021 issued by the International Searching Authority in International Application No. PCT/KR2020/013903.

Communication dated Jan. 17, 2022, issued by the European Patent Office in European Application No. 20188760.1.

* cited by examiner

DIRECT TYPE BACK LIGHT DEVICE AND DISPLAY APPARATUS HAVING THE SAME

CROSS-REFERENCE TO RELATED APPLICATION(S)

This application is based on and claims priority under 35 U.S.C. § 119 to Korean Patent Application No. 10-2019-0130989, filed on Oct. 21, 2019, in the Korean Intellectual Property Office, the disclosure of which is incorporated by reference herein in its entirety.

BACKGROUND

1. Field

The disclosure relates to a display apparatus, and more particularly, to a direct-type backlight device and a display apparatus having the same.

2. Description of Related Art

Currently, a liquid crystal display apparatus, which occupies the largest portion in a display market, uses a liquid crystal panel that cannot emit light itself, and a backlight device is used as a light source of the liquid crystal display apparatus.

When the backlight device irradiates light toward the liquid crystal panel, the liquid crystal panel may display an image.

Such a backlight device may be generally classified into an edge type backlight device and a direct type backlight device depending on the arrangement structure of the light source.

The edge type backlight device has a structure in which one light source is disposed on one side of a light guide plate, or two light sources are disposed on both sides of the light guide plate. A reflective sheet is disposed below the light guide plate to reflect light exiting a bottom surface of the light guide plate toward the liquid crystal panel. A diffusion sheet for diffusing light exiting a top surface of the light guide plate may be provided on an upper side of the light guide plate.

On the other hand, the direct type backlight device has a structure in which a plurality of light sources are disposed under a diffusion plate.

There is a problem in the related art that the productivity of the direct type backlight device and the display apparatus including the direct type backlight device decreases with the increase in the size of the display apparatus.

SUMMARY

Provided are a direct type backlight device capable of improving productivity and a display apparatus having the same.

According to an aspect of the disclosure, there is provided a direct type backlight device including: a lower chassis; a reflective sheet disposed on a bottom portion of the lower chassis; and a plurality of light emitting diode (LED) bars disposed on a upper surface of the reflective sheet, wherein each LED bar of the plurality of LED bars may include a bar-shaped printed circuit board disposed on the upper surface of the reflective sheet; a plurality of LEDs disposed on a upper surface of the printed circuit board; and a reflective member provided on the upper surface of the printed circuit board, and wherein a reflectance of the reflective member may be at least 90% of a reflectance of the reflective sheet.

The reflective member may include a photo solder resist (PSR) layer having a high reflectance.

According to an aspect of the disclosure, there is provided a display apparatus including: a liquid crystal panel; a diffusion plate disposed under the liquid crystal panel; a plurality of light emitting diode (LED) bars disposed under the diffusion plate; a reflective sheet disposed on or under the plurality of LED bars; and a lower chassis disposed on or under the reflective sheet and configured to support the reflective sheet, wherein each LED bar of the plurality of LED bars may include a bar-shaped printed circuit board disposed over the reflective sheet; a plurality of LEDs disposed on an upper surface of the printed circuit board; and a reflective member provided on the upper surface of the printed circuit board, and wherein a reflectance of the reflective member may be at least 90% of a reflectance of the reflective sheet.

According to an aspect of an embodiment of the disclosure, there is provided a method of manufacturing a direct type backlight device, the method including: providing a reflective sheet on an upper surface of a bottom portion a lower chassis; after the reflective sheet is disposed on the lower chassis, providing a plurality of light emitting diode (LED) bars on an upper surface of the reflective sheet, each LED bar of the plurality of LED bars including a printed circuit board, a plurality of LEDs, and a reflective member; and providing a diffusion plate above the plurality of LED bars.

BRIEF DESCRIPTION OF THE DRAWINGS

These and/or other aspects and advantages of certain embodiments of the disclosure will be more apparent from the following description taken in conjunction with the accompanying drawings of which.

DETAILED DESCRIPTION

Hereinafter, certain embodiments of a direct type backlight device and a display apparatus having the same according to the disclosure will be described in detail with reference to the accompanying drawings.

Various embodiments will hereinafter be described with reference to the accompanying drawings. However, it is to be understood that technologies mentioned in the disclosure are not limited to specific embodiments, but include various modifications, equivalents, and/or alternatives according to embodiments of the disclosure. The matters defined herein, such as a detailed construction and elements thereof, are provided to assist in a comprehensive understanding of this description. Thus, it is apparent that embodiments may be carried out without those defined matters. Also, well-known functions or constructions are omitted to provide a clear and concise description of embodiments. Further, dimensions of various elements in the accompanying drawings may be arbitrarily increased or decreased for assisting in a comprehensive understanding.

The terms 'first', 'second', etc. may be used to describe diverse components, but the components are not limited by the terms. The terms may only be used to distinguish one component from the others. For example, without departing from the scope of the disclosure, a first component may be referred to as a second component, and similarly, a second component may also be referred to as a first component.

The terms used in embodiments of the disclosure may be construed as commonly known to those skilled in the art unless otherwise defined.

Further, the terms 'leading end', 'rear end', 'upper side', 'lower side', 'top end', 'bottom end', etc. used in the disclosure are defined with reference to the drawings. However, the shape and position of each component are not limited by the terms.

In the following description, when an element is referred to as being "above", "over", "on", "connected to" or "coupled to" another element, it may be directly above, over, on, connected to, or coupled to the other element while making contact with the other element or may be above, over, on, connected to, or coupled to the other element without making contact with the other element (that is, intervening element(s) may be present).

Figure 1:
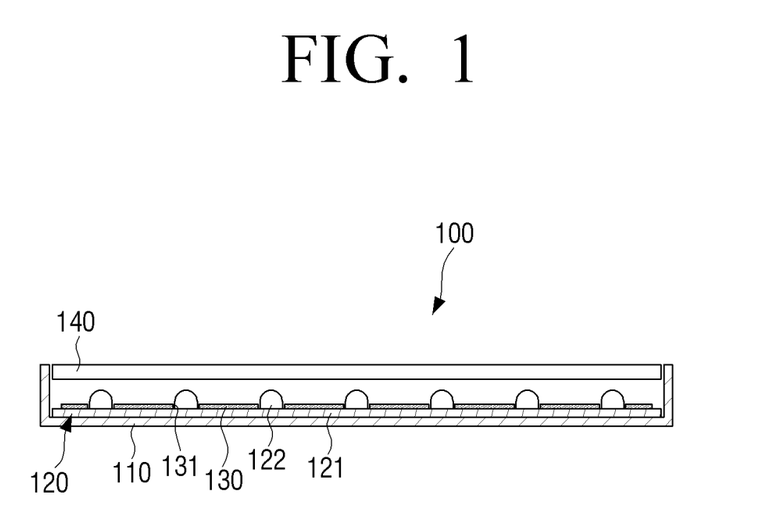
FIG. 1 is a cross-sectional view schematically illustrating a general direct type backlight device.

FIG. 1 is a cross-sectional view schematically illustrating a general direct type backlight device.

Referring to FIG. 1, a general direct type backlight device 100 includes a lower chassis 110, a light emitting diode (LED) bar 120, a reflective sheet 130, and a diffusion plate 140. Although only one LED bar 120 is shown in FIG. 1, the general direct type backlight device 100 includes a plurality of LED bars 120.

The plurality of LED bars 120 are disposed and spaced apart at predetermined intervals on an upper surface of the lower chassis 110. Each of the plurality of LED bars 120 includes a bar-shaped printed circuit board 121 and a plurality of LEDs 122 disposed on the printed circuit board 121.

The reflective sheet 130 having a size corresponding to the diffusion plate 140 is disposed on the plurality of LED bars 120. A plurality of through holes 131 are formed in the reflective sheet 130 so that the plurality of LEDs 122 provided on the plurality of LED bars 120 may be exposed through the plurality of through holes 131. Accordingly, when the reflective sheet 130 is disposed on the plurality of LED bars 120 provided on the lower chassis 110, the plurality of LEDs 122 protrude from the reflective sheet 130, and the printed circuit boards 121 are positioned under the reflective sheet 130. In other words, the printed circuit boards 121 of the LED bars 120 are covered by the reflective sheet 130.

The diffusion plate 140 is provided above the reflective sheet 130 and the plurality of LEDs 122.

A liquid crystal panel is provided above the diffusion plate 140, and light emitted from the plurality of LEDs 122 moves through the diffusion plate 140 toward the light crystal panel. The light exiting a rear surface of the diffusion plate 140 is reflected by the reflective sheet 130 and again enters the diffusion plate 140.

When manufacturing the direct type backlight device 100 as illustrated in FIG. 1, in order to dispose the reflective sheet 130 on the plurality of LED bars 120, the plurality of LEDs 122 of the plurality of LED bars 120 need to be manually inserted into the plurality of through holes 131 formed in the reflective sheet 130.

As a display apparatus including the backlight device becomes larger, a size of the direct type backlight device 100 also increases. When a size of the reflective sheet 130 of the direct type backlight device 100 also increases, it becomes very difficult to manually insert the plurality of LEDs 122 of the plurality of LED bars 120 one by one into the plurality of through holes 131 formed in the reflective sheet 130.

Figure 2:
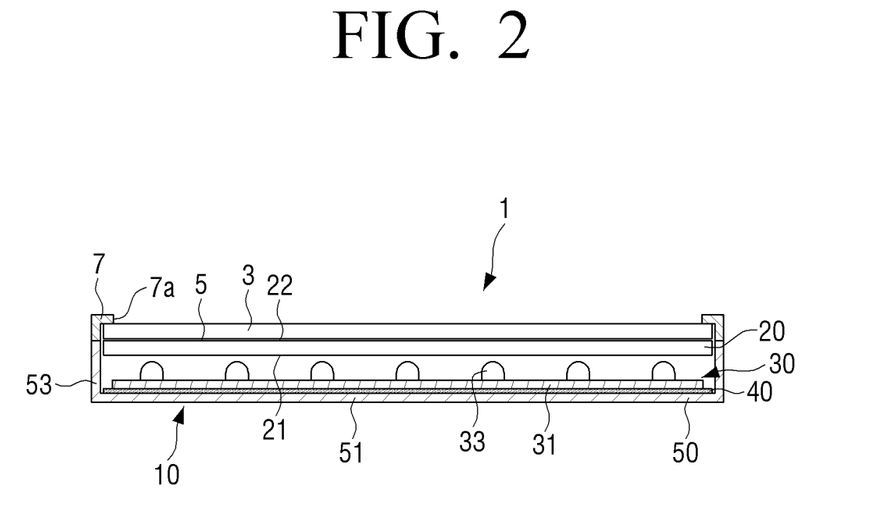
FIG. 2 is a cross-sectional view schematically illustrating a display apparatus according to an embodiment.
Figure 3:
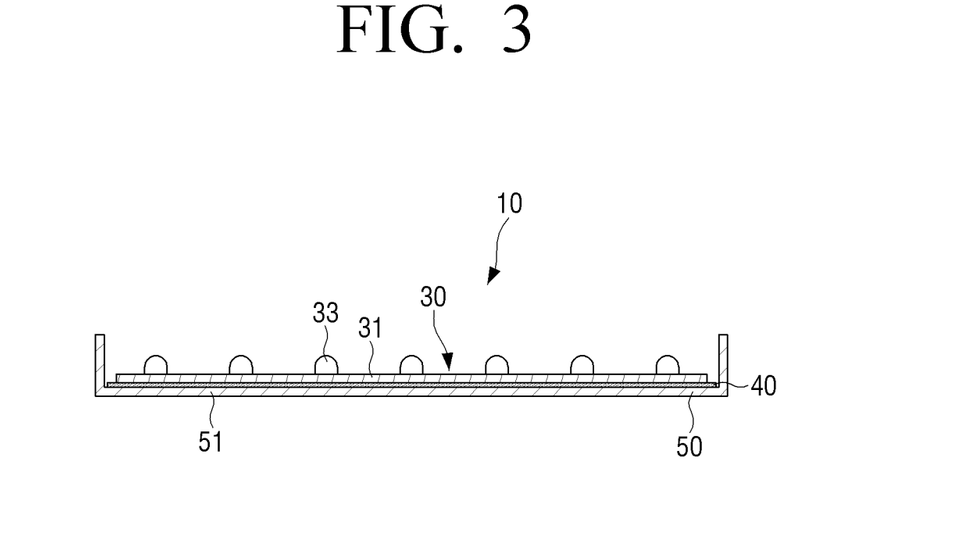
FIG. 3 is a cross-sectional view schematically illustrating a direct type backlight device according to an embodiment.
Figure 4:
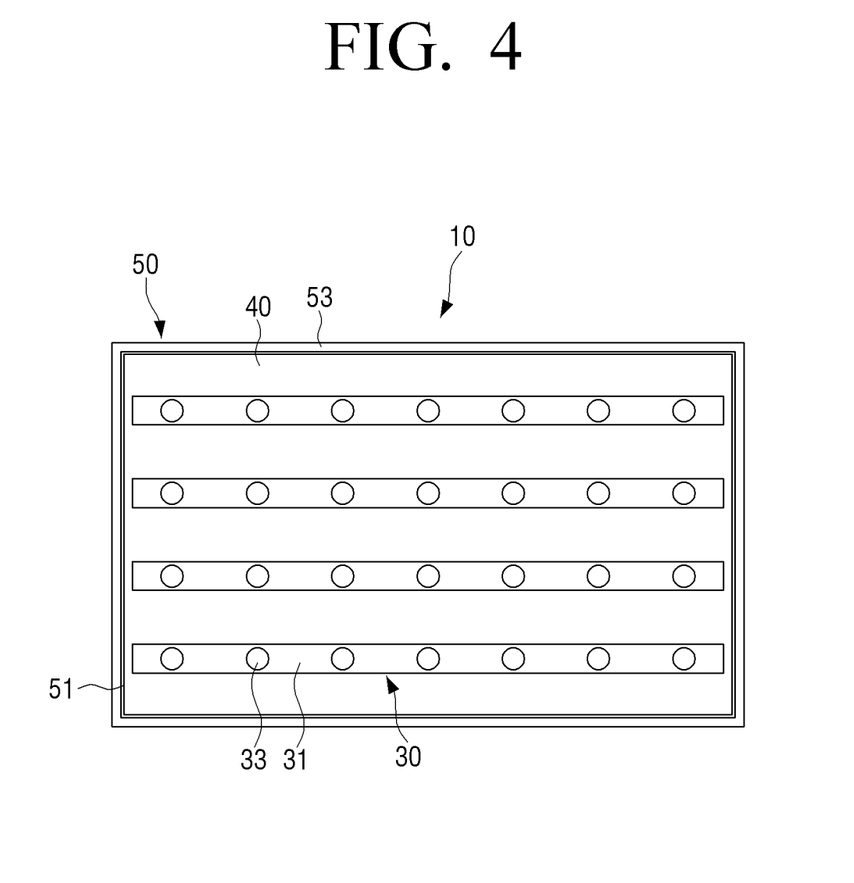
FIG. 4 is a plan view illustrating the direct type backlight device of FIG. 3.

FIG. 2 is a cross-sectional view schematically illustrating a display apparatus according to an embodiment. FIG. 3 is a cross-sectional view schematically illustrating a direct type backlight device according to an embodiment, and FIG. 4 is a plan view illustrating the direct type backlight device of FIG. 3.

Referring to FIG. 2, a display apparatus 1 according to an embodiment may include a liquid crystal panel 3 configured to display an image, a direct type backlight device 10 configured to supply light to the liquid crystal panel 3, and an optical sheet 5 to improve properties of the light being supplied from the direct type backlight device 10 to the liquid crystal panel 3.

The liquid crystal panel 3 is configured to receive light from the backlight device 10, disposed under the liquid crystal panel 3, and to display an image. The liquid crystal panel 3 may include a color filter substrate having a color filter layer and a thin film transistor substrate having a plurality of thin film transistors. A liquid crystal may be accommodated between the color filter substrate and the thin film transistor substrate. Because a liquid crystal panel according to a known technique may be used as the liquid crystal panel 3, a detailed description thereof is omitted.

The liquid crystal panel 3 may be coupled to the direct type backlight device 10 including an upper chassis 7. The upper chassis 7 is provided with an opening 7a through which a top surface of the liquid crystal panel 3 is exposed.

The optical sheet 5 is used for improving the optical characteristics of light incident from the direct type backlight device 10 to the liquid crystal panel 3, and is provided between the liquid crystal panel 3 and the direct type backlight device 10.

The direct type backlight device 10 (hereinafter, referred to as a backlight device) is configured to supply light to the liquid crystal panel 3 and has a rectangular shape when viewed in a plan view as shown in FIG. 4.

Referring to FIGS. 3 and 4, the backlight device 10 may include a diffusion plate 20, a plurality of light emitting diode (LED) bars 30 disposed under the diffusion plate 20, a reflective sheet 40 provided on or under the plurality of LED bars 30, and a lower chassis 50 provided on or under the reflective sheet 40.

The diffusion plate 20 is formed to minimize the loss of light emitted from the plurality of LED bars 30 provided thereunder, and to distribute light evenly over an entire surface of the liquid crystal panel 3 and at the same time collect light in one direction.

The diffusion plate 20 is formed in a rectangular flat plate shape having a size corresponding to the liquid crystal panel 3, and includes a transmissive material capable of transmitting light. For example, the diffusion plate 20 may include a transparent plastic such as polymethyl methacrylate (PMMA), polycarbonate (PC), and the like.

A lower surface 21 of the diffusion plate 20 is an incident surface on which light emitted from the plurality of LED bars 30 is incident, and an upper surface 22 of the diffusion plate 20 is a light exit surface from which the light incident from the plurality of LED bars 30 is emitted toward the liquid crystal panel 3. Therefore, the light emitted from the plurality of LED bars 30 is incident on the lower surface 21 of the diffusion plate 20, passes through the diffusion plate 20, and is discharged toward the liquid crystal panel 3 through the upper surface 22 of the diffusion plate 20.

The optical sheet 5 may be disposed on the upper surface 22 of the diffusion plate 20, that is, between the diffusion plate 20 and the liquid crystal panel 3. The optical sheet 5 may minimize light loss by using refraction and reflection of light to be emitted toward the liquid crystal panel 3, thereby improving brightness of light emitted through the diffusion plate 20 toward the liquid crystal panel 3 and allowing light to be evenly distributed on the liquid crystal panel 3.

The optical sheet 5 may include a prism sheet that improves brightness by refracting light, a dual brightness enhancement film that selectively transmits and reflects light to improve brightness, and the like. The optical sheet 5 may be the same as or similar to the general optical sheets used in the related art display apparatus; therefore, a detailed description thereof is omitted.

The plurality of LED bars 30 is a light source that supplies light to the liquid crystal panel 3 and is disposed under the diffusion plate 20. The plurality of LED bars 30 are disposed at regular intervals on an upper surface of the lower chassis 50, that is, on the reflective sheet 40, as illustrated in FIG. 4 to uniformly supply light to the diffusion plate 20. The structure of the plurality of LED bars 30 will be described later.

The reflective sheet 40 is disposed on or under the plurality of LED bars 30. In detail, the reflective sheet 40 is disposed on an upper surface of a bottom portion 51 of the lower chassis 50. The plurality of LED bars 30 are disposed on an upper surface of the reflective sheet 40. Accordingly, the reflective sheet 40 is positioned on or over the lower chassis 50 and the LED bars 30 are positioned on or over the reflective sheet 40. In other words, the reflective sheet 40 is disposed between the lower chassis 50 and the plurality of LED bars 30.

The reflective sheet 40 reflects a part of light emitted from the plurality of LED bars 30, and light that is reflected from the optical sheet 5 and then exits through a lower surface of the diffusion plate 20, such that the reflected light is guided toward the diffusion plate 20. The light reflected by the reflective sheet 40 travels toward the liquid crystal panel 3 through the diffusion plate 20.

The reflective sheet 40 may be formed in a thin film shape (e.g., a rectangular shape) corresponding to the diffusion plate 20. The reflective sheet 40 may include white opaque plastic to reflect light from the lower surface 21 of the diffusion plate 20. For example, the reflective sheet 40 may include any one of polyester terephthalate (PET), polycarbonate (PC), and polyester.

The lower chassis 50 may support the diffusion plate 20, the reflective sheet 40, and the plurality of LED bars 30. The reflective sheet 40 is disposed on the upper surface of the bottom portion 51 of the lower chassis 50, and the plurality of LED bars 30 are disposed on the upper surface of the reflective sheet 40. On an edge of the bottom portion 51 of the lower chassis 50, side walls 53 extending vertically upward are provided.

The lower chassis 50 may include a metal material so that heat generated from the plurality of LED bars 30, a control panel configured to control the liquid crystal panel 3, and the like may be easily dissipated to the outside. In the embodiment shown in FIG. 3, the bottom portion 51 of the lower chassis 50 is formed in a flat plate shape.

Figure 5:
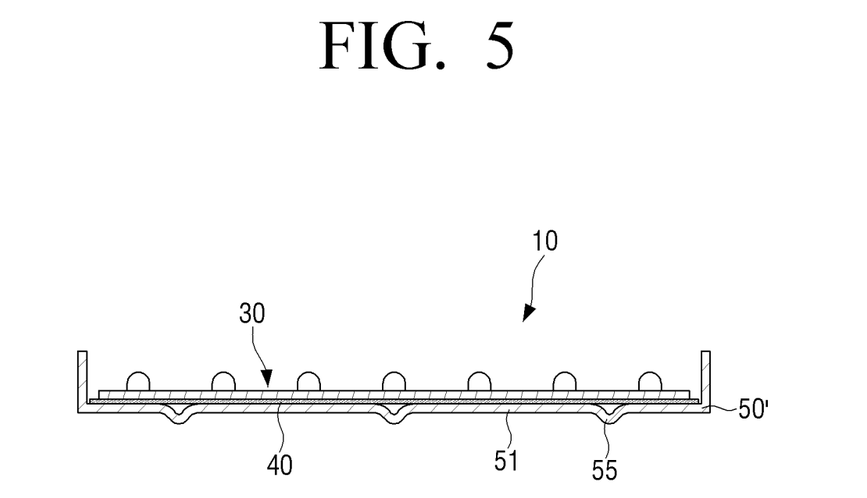
FIG. 5 is a cross-sectional view schematically illustrating a direct type backlight device according to an embodiment.

FIG. 5 is a cross-sectional view schematically illustrating another example of a direct type backlight device according to an embodiment. As another example of the lower chassis 50, as illustrated in FIG. 5, a bottom portion 51' of the lower chassis 50 may include a plurality of beadings 55 to increase rigidity while reducing thickness.

The lower chassis 50 may be formed to be coupled with the upper chassis 7. For example, the side walls 53 of the lower chassis 50 may be formed to be coupled with the upper chassis 7. Therefore, the liquid crystal panel 3 and the backlight device 10 may be fixed by the upper chassis 7 and the lower chassis 50.

In addition, a middle mold supporting the liquid crystal panel 3 may be disposed between the lower chassis 50 and the upper chassis 7.

Further, the display apparatus 1 may include a case that forms an external appearance of the display apparatus 1 and accommodates the upper chassis 7 and the lower chassis 50, and may include a main control panel that is provided inside the case and configured to control the liquid crystal panel 3 and the plurality of LED bars 30 to display an image.

Hereinafter, the plurality of LED bars 30 used in the backlight device 10 according to an embodiment will be described in detail with reference to FIGS. 3, 4, and 6. The plurality of LED bars 30 are formed in the same structure; therefore, only one LED bar 30 will be described below for brevity of description.

Figure 6:
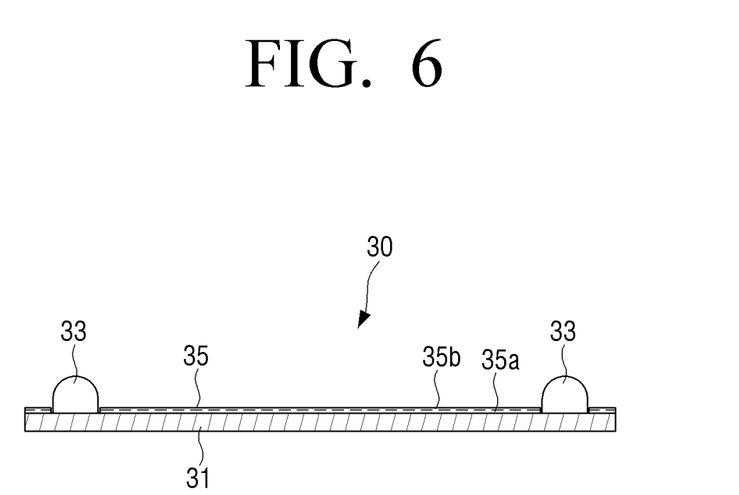
FIG. 6 is a partial cross-sectional view illustrating an LED bar used in a direct type backlight device according to an embodiment.

FIG. 6 is a partial cross-sectional view illustrating an example of an LED bar used in a direct type backlight device according to an embodiment.

Referring to FIGS. 3, 4, and 6, the LED bar 30 may include a bar-shaped printed circuit board 31, and a plurality of light emitting diodes (LEDs) 33 disposed on an upper surface of the printed circuit board 31.

The printed circuit board 31 is formed in a bar shape, e.g., a rectangular flat plate having a narrow width and a long length. On the upper surface of the printed circuit board 31, the plurality of LEDs 33 are disposed at regular intervals. Also, a power line for supplying power to the plurality of LEDs 33 may be formed in the printed circuit board 31.

The plurality of LEDs 33 are configured to generate light, and disposed at regular intervals on the upper surface of the printed circuit board 31. Further, the plurality of LEDs 33 are arranged in a straight line on the upper surface of the printed circuit board 31. The light generated from the plurality of LEDs 33 moves toward the liquid crystal panel 3 through the diffusion plate 20. The plurality of LEDs 33 may be disposed on the printed circuit board 31 by using surface mounting technology. The plurality of LEDs 33 are the same as or similar to general LEDs; therefore, a detailed description thereof is omitted.

The upper surface of the printed circuit board 31 may be provided with a reflective member 35 capable of reflecting a part of the light emitted from the plurality of LEDs 33 and the light emitted from the lower surface of the diffusion plate 20. The reflective member 35 may be provided on a portion of the upper surface of the printed circuit board 31 where the plurality of LEDs 33 are not disposed. Accordingly, the reflective member 35 may be disposed to cover a majority of or nearly all of the upper surface of the printed circuit board 31 except for portions where the plurality of LEDs 33 are disposed.

The reflective member 35 may be formed such that a reflectance of the reflective member 35 is a certain degree (e.g., 90%) or more of the reflectance of the reflective sheet 40. To this end, the reflective member 35 may be formed in a photo solder resist (PSR) layer having a high reflectance. In other words, the PSR layer may be formed on the upper surface of the printed circuit board 31 as the reflective member 35. In the following description, the reflectance may include specular reflectance and diffuse reflectance. When not specified, the reflectance means a lower reflectance of the specular reflectance and the diffuse reflectance.

A process of manufacturing the LED bar 30 may include a photo solder resist (PSR) process for coating an inactive area by applying PSR ink or PSR paint on the upper surface of the printed circuit board 31 and a reflow process for mounting the plurality of LEDs 33 on the upper surface of the printed circuit board 31 to which the PSR ink or the PSR paint is applied.

In the PSR process, a permanent ink may be coated on the upper surface of the printed circuit board 31 to protect circuits formed on the upper surface of the printed circuit board 31 and to prevent the occurrence of a solder bridge phenomenon between the circuits in the next process.

The PSR process may include a pretreatment operation, a printing operation, a PSR exposure operation, a PSR development operation, and a drying operation.

The pretreatment operation is a process of removing an oxide film, oil, and the like which adversely affects an adhesion between a surface (e.g., an upper surface) of the printed circuit board 31 and the PSR ink and a process of providing roughness to a surface of a copper foil that form the circuits. Accordingly, the adhesion between the PSR ink and the copper foil in the printing operation may be improved.

The printing operation is a process of protecting the circuits of the printed circuit board 31 by applying the PSR ink to the surface of the printed circuit board 31 on which the circuits are formed. The printing operation may include a screen coating method, a spray coating method, and the like according to a method of applying the PSR ink to the surface of the printed circuit board 31.

The PSR exposure operation is a process of selectively photocuring the PSR ink coated on the upper surface of the printed circuit board 31 as an area to act as a resist and an area to expose the copper foil by using a patterned exposure mask and ultraviolet.

The PSR development operation is a process of exposing the copper foil by removing a portion of the PSR ink of the printed circuit board 31 that is not cured because the portion of the PSR ink does not receive ultraviolet rays with a developing solution after exposure.

The drying operation is a process of completely curing the PSR ink by applying hot air to the printed circuit board 31 for a period of time after the PSR development operation is completed.

When the PSR process as described above is completed, the upper surface of the printed circuit board 31 is in a state in which the copper foil is exposed only in a plurality of portions where the plurality of LEDs 33 are to be disposed, and the PSR layer 35 having a high reflectance is formed on the remaining portions.

After the PSR process is completed, the plurality of LEDs 33 are mounted on the printed circuit board 31. For example, the plurality of LEDs 33 may be mounted on the plurality of exposed portions of the copper foil of the printed circuit board 31 using the reflow process.

In detail, the reflow process may include a printing process, a mounting process, and a reflow soldering process.

In the printing process, a solder paste is applied to the portions of the printed circuit board 31 where the copper foil is exposed.

The mounting process is performed after the printing process is completed. In the mounting process, the plurality of LEDs 33 are placed on the portions of the printed circuit board 31 where the copper foil is exposed, that is, the portions where the solder paste is applied by using a surface mounting technology (SMT) machine.

Thereafter, the reflow soldering process is performed. In the reflow soldering process, when heat is applied by using a reflow soldering machine, the plurality of LEDs 33 are fixed to the printed circuit board 31 while the solder paste melts. The reflow soldering process may be performed two or more times as needed.

The LED bar 30 used in the backlight device 10 according to the embodiment of the disclosure may be manufactured through the PSR process and the reflow process as described above.

In an embodiment, in order to form the PSR layer 35 having a high reflectance in the PSR process, a PSR ink or a PSR paint having a high reflectance may be used.

As another example, in order to increase the reflectance of the PSR layer 35, a PSR ink having a general reflectance, for example, a PSR ink having a reflectance of about 81% to about 83%, may be applied twice or more to form the PSR layer 35. FIG. 6 shows a case where the PSR layer 35 is formed by applying the PSR ink twice. When the PSR layer 35 is formed by applying the PSR ink twice, the thickness of the PSR layer 35 is approximately doubled, and the reflectance of the PSR layer 35 may be increased.

As another example, the reflectance of the PSR layer 35 may be improved by surface-treating the upper surface of the PSR layer 35 including a PSR ink having a general reflectance.

On the other hand, the LED bar 120 (see FIG. 1) included in the general direct type backlight device 100 has a reflectance (e.g., diffuse reflectance, specular component excluded (SCE)) of the upper surface of the printed circuit board 121 of about 81% to about 83%. On the other hand, the reflectance (e.g., diffuse reflectance) of the reflective sheet 130 is about 97%.

Therefore, when the LED bar 120 of the general direct type backlight device is disposed on the reflective sheet 40, the difference in luminance appears on a screen formed by the liquid crystal panel due to the difference between the reflectance of the upper surface of the printed circuit board 121 and the reflectance of the reflective sheet 130.

For example, a dark horizontal line corresponding to the LED bar 120 in the related art may appear on the liquid crystal panel. In other words, when the LED bar 120 in the related art is used, the LED bar 120 may be recognized or visible through the liquid crystal panel. In other words, there is a problem that the user may recognize the LED bar 120 through the liquid crystal panel.

In order to solve this problem, according to embodiments of the disclosure, the PSR layer 35 may be formed on the upper surface of the printed circuit board 31 and the reflectance of the PSR layer 35 of the printed circuit board 31 of the LED bars 30 may be about 90% of the reflectance of the reflective sheet 40. In other words, when the reflectance of the reflective sheet 40 is 100%, the PSR layer 35 is formed to have the reflectance of 90% or more. For example, when the reflectance of the reflective sheet 40 is 97%, the PSR layer 35 is formed to have the reflectance of about 87% or more.

In the above, the reflectance of the PSR layer 35 is described as about 90% of the reflectance of the reflective sheet 40; however, this is merely an example and is not limiting. A ratio of the reflectance of the PSR layer 135 to the reflectance of the reflective sheet 40 may be determined as appropriate depending on an embodiment. Hereinafter, for illustrative purposes, an example in which the reflectance of the reflective sheet 40 is 97% and the PSR layer 35 is formed to have the reflectance of about 87% or more is described.

Because the upper surface of the PSR layer 35 is positioned above the upper surface of the reflective sheet 40 by the thickness of the printed circuit board 31, when the reflectance of the PSR layer 35 is about 90% or more of the reflectance of the reflective sheet 40, the LED bars 30 may not be viewable through the liquid crystal panel 3.

As described above, because the printed circuit board 31 in which the plurality of LEDs 33 are disposed passes the reflow soldering process at least one time during the manufacturing process of the LED bar 30, the reflectance of the PSR layer 35 formed on the printed circuit board 31 may be changed.

Therefore, a PSR ink that allows the reflectance of the PSR layer 35 of the printed circuit board 31 to be 90% or more of the reflectance of the reflective sheet 40 after the reflow soldering process is completed may be used. In other words, the PSR layer 35 may be formed by using a PSR ink that allows the reflectance of the PSR layer 35 to be about 87% or more.

On the other hand, when the printed circuit board 31 performs the reflow soldering process twice to form the LED bar 30, the reflectance of the PSR layer 35 needs to be 90% or more of the reflectance of the reflective sheet 40 after the reflow soldering process is completed twice. In other words, a PSR ink that allows the reflectance of the PSR layer 35 of the printed circuit board 31 to be about 87% or more after the reflow soldering process is completed twice may be used.

Alternatively, the PSR layer 35 may be formed by applying a PSR ink having a general reflectance to the printed circuit board 31 two or more time, such that the reflectance of the PSR layer 35 is about 87% or more.

For example, referring to FIG. 6, the PSR ink having a general reflectance is applied to the upper surface of the printed circuit board 31 and dried to form a lower PSR layer 35a having a thickness of approximately 20 to 25 Subsequently, the same PSR ink is applied to the lower PSR layer 35a and dried to form an upper PSR layer 35b. Thus, a PSR layer 35 is formed to include the lower PSR layer 35a and the upper PSR layer 35b and to have a thickness of about 40 μm to about 50 Thus, the reflectance of the upper surface of the PSR layer 35, that is, the upper surface of the upper PSR layer 35b is improved, so that the reflectance of the PSR layer 35 of the printed circuit board 31 after performing the reflow process is 87% or more.

On the other hand, when the printed circuit board 31 performs the reflow soldering process twice to form the LED bar 30, after the reflow soldering process is completed twice, the reflectance of the PSR layer 35 including the lower PSR layer 35a and the upper PSR layer 35b is formed to be 90% or more of the reflectance of the reflective sheet 40.

Table 1 below shows the change in reflectance of the PSR layer 35 according to the reflow soldering process.

TABLE 1

|  | Reflow times | Reflectance (SCI) (%) | Reflectance (SCE) (%) |
| --- | --- | --- | --- |
| PSR layer | Reference | 93.29 | 92.32 |
|  | Once | 90.55 | 89.86 |
|  | Twice | 90.02 | 89.33 |

In Table 1, "Reference" in a column of the reflow times indicates a reflectance of the PSR layer 35 formed on the printed circuit board 31 before performing the reflow soldering process. "Once" indicates that the reflow soldering process is performed once on the printed circuit board 31 on which the PSR layer 35 is formed, and "Twice" indicates that the reflow soldering process is performed twice on the printed circuit board 31 on which the PSR layer 35 is formed. Table 1 includes a specular component included (SCI) reflectance and a specular component excluded (SCE) reflectance of the PSR layer 35. The SCI reflectance represents the specular reflectance of the PSR layer 35 and the SCE reflectance represents the diffuse reflectance of the PSR layer 35.

As shown in Table 1 above, it can be seen that the reflectance of the PSR layer 35 of the printed circuit board 31 exceeds 87% for both the specular reflectance (SCI) and the diffuse reflectance (SCE). In particular, it can be seen that even after performing the reflow soldering process twice, the SCI reflectance and the SCE reflectance of the PSR layer 35 exceed 87%. Therefore, the reflectance of the LED bar 30 according to an embodiment having the PSR layer 35 as described above is also greater than 87%.

Hereinafter, an LED bar according to another embodiment will be described in detail with reference to FIG. 7.

Figure 7:
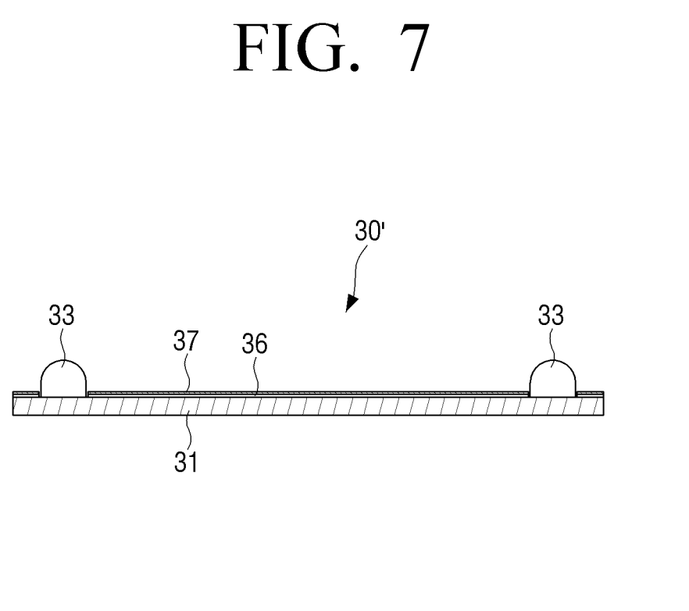
FIG. 7 is a partial cross-sectional view illustrating an LED bar used in a direct type backlight device according to an embodiment.

FIG. 7 is a partial cross-sectional view illustrating another example of an LED bar used in a direct type backlight device according to an embodiment.

Referring to FIG. 7, an LED bar 30' according to an embodiment may include a printed circuit board 31, a plurality of LEDs 33, and a reflective member 37.

The printed circuit board 31 and the plurality of LEDs 33 may be the same as or similar to those of the above-described embodiment(s); therefore, detailed descriptions thereof are omitted.

The reflective member 37 may be formed as a reflective layer on a protective PSR layer 36 of the printed circuit board 31. In the embodiment of FIG. 6, the PSR layer 35 functions to reflect light, but in the embodiment of FIG. 7, a separate reflective layer 37 may be formed on a protective PSR layer 36. Therefore, the protective PSR layer 36 formed on the printed circuit board 31 does not need to have a high reflectance, unlike the above-described PSR layer 35.

After the protective PSR layer 36 is formed on the printed circuit board 31, the reflective layer 37 may be formed by using a reflective ink or a reflective paint different from the PSR ink or PSR paint forming the protective PSR layer 36. For example, after forming the protective PSR layer 36 on the printed circuit board 31, the reflective ink is applied to the upper surface of the protective PSR layer 36 with a predetermined thickness to form the reflective layer 37.

The reflective layer 37 may be formed such that the reflectance of the reflective layer 37 is about 90% of the reflectance of the reflective sheet 40. In other words, when the reflectance of the reflective sheet 40 is 100%, the reflective layer 37 is formed to have the reflectance of 90% or more. For example, when the reflectance of the reflective sheet 40 is 97%, the reflective layer 37 is formed to have the reflectance of 87% or more.

As described above, because the printed circuit board 31 on which the plurality of LEDs 33 are disposed passes the reflow soldering process at least one time during the manufacturing process of the LED bar 30', the reflectance of the reflective layer 37 formed on the printed circuit board 31 may be changed.

Therefore, the reflective layer 37 may be formed by using a reflective ink or a reflective paint that allows the reflectance of the reflective layer 37 of the printed circuit board 31 to be 90% or more of the reflectance of the reflective sheet 40 after the reflow soldering process is completed. In other words, when the reflectance of the reflective sheet 40 is 97%, the reflective layer 37 is formed using a reflective ink or a reflective paint that allows the reflectance of the reflective layer 37 to be about 87% or more.

On the other hand, when the printed circuit board 31 performs the reflow soldering process twice to form the LED bar 30, the reflectance of the reflective layer 37 needs to be 90% or more of the reflectance of the reflective sheet 40 after the reflow soldering process is completed twice. In other words, when the reflectance of the reflective sheet 40 is 97%, a reflective ink or a reflective paint that allows the reflectance of the reflective layer 37 to be about 87% or more after the reflow soldering process is completed twice is used.

In the above description, the reflective ink or the reflective paint that forms the reflective layer 37 refers to an ink or a paint that has a different component from that of the PSR ink or the PSR paint and allows the reflective layer 37 to have a high reflectance when the reflective layer 37 is coated on the upper surface of the PSR layer 36 of the printed circuit board 31.

Hereinafter, an LED bar according to another embodiment will be described in detail with reference to FIGS. 8 and 9.

Figure 8:
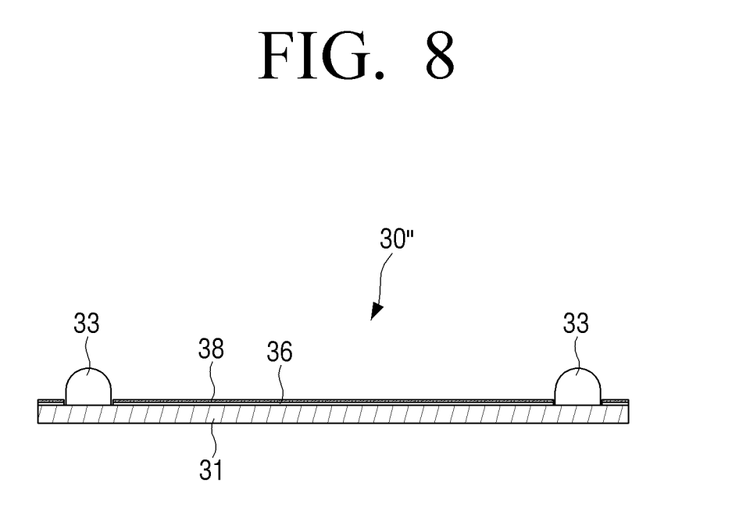
FIG. 8 is a partial cross-sectional view illustrating an LED bar used in a direct type backlight device according to an embodiment.

FIG. 8 is a partial cross-sectional view illustrating another example of an LED bar used in a direct type backlight device according to an embodiment. FIG. 9 is a plan view illustrating a reflective cover disposed on the LED bar of FIG. 8.

Referring to FIG. 8, an LED bar 30" according to an embodiment may include a printed circuit board 31, a plurality of LEDs 33, and a reflective member 38.

The printed circuit board 31 and the plurality of LEDs 33 are the same as or similar to those of the LED bar 30 of the above-described embodiment(s); therefore, detailed descriptions thereof are omitted.

The reflective member 38 may be formed as a reflective cover disposed on the protective PSR layer 36 of the printed circuit board 31. In the embodiment of FIG. 6, the PSR layer 35 of the printed circuit board 31 functions to reflect light, but in the embodiment of FIG. 8, a separate reflective cover 38 is disposed on the protective PSR layer 36 to reflect light.

Figure 9:
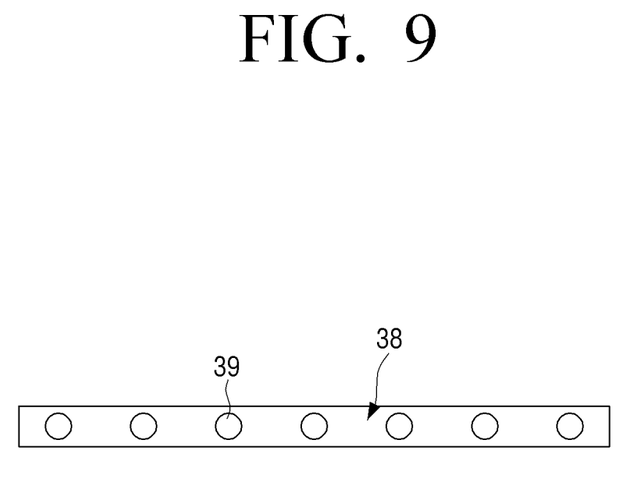
FIG. 9 is a plan view illustrating a reflective cover disposed on the LED bar of FIG. 8.

As illustrated in FIG. 9, the reflective cover 38 is formed in a shape corresponding to the printed circuit board 31, and includes a plurality of through holes 39 into which the plurality of LEDs 33 are inserted.

In detail, the reflective cover 38 includes a film of a rectangular shape having a narrow width and a long length, and the plurality of through holes 39 in which the plurality of LEDs 33 are inserted are formed in a straight line. For example, the reflective cover 38 is formed in the same size and shape as the printed circuit board 31, and includes the plurality of through holes 39 corresponding to the plurality of LEDs 33 disposed on the printed circuit board 31.

Therefore, when the reflective cover 38 is disposed on the upper surface of the printed circuit board 31, the plurality of LEDs 33 protrude from the reflective cover 38 through the plurality of through holes 39, and the upper surface of the printed circuit board 31 is covered by the reflective cover 38, so that the upper surface of the printed circuit board 31 is not exposed to the outside.

The reflective cover 38 may include the same material as the reflective sheet 40 disposed on the lower chassis 50. As another example, the reflective cover 38 may include a material having a reflectance of about 90% or more of the reflectance of the reflective sheet 40 and having a different component from that the reflective sheet 40.

The reflective cover 38 may be disposed on the upper surface of the printed circuit board 31 after the LED bar 30" including components other than the reflective cover 38 is manufactured, and before the LED bar 30" including the reflective cover 38 is disposed on the lower chassis 50.

As another example, a plurality of openings in which the plurality of LED bars 30" are disposed may be formed in the reflective sheet 40. The plurality of openings are formed in sizes corresponding to the plurality of LED bars 30". Accordingly, when the plurality of LED bars 30" are disposed in the plurality of openings of the reflective sheet 40, the printed circuit board 31 is positioned on the bottom portion 51 of the lower chassis 50, and the bottom portion 51 of the lower chassis 50 on which the reflective sheet 40 is disposed is not exposed.

In this example, the above-described reflective cover 38 may be formed by using a rectangular piece of the reflective sheet 40 that is cut when forming the plurality of openings in the reflective sheet 40. When the reflective cover 38 includes the portion cut from the reflective sheet 40 as described above, material cost may be reduced.

Hereinafter, a method of manufacturing a direct type backlight device according to an embodiment will be described with reference to FIG. 10.

Figure 10:
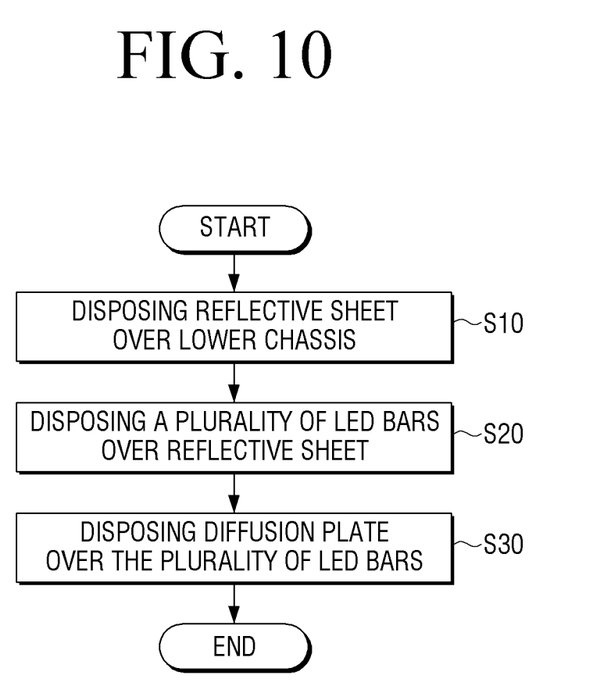
FIG. 10 is a flowchart illustrating a method of manufacturing a direct type backlight device according to an embodiment.

FIG. 10 is a flowchart illustrating a method of manufacturing a direct type backlight device according to an embodiment.

To manufacture the direct type backlight device 10, first, the lower chassis 50 and the reflective sheet 40 are prepared. A plurality of through holes corresponding to the plurality of LEDs 33 of the plurality of LED bars 30 are not formed in the reflective sheet 40. Therefore, because a process of forming the plurality of through holes in the reflective sheet 40 is not necessary, the manufacturing cost of the reflective sheet 40 may be reduced.

Subsequently, the reflective sheet 40 is disposed on the upper surface of the bottom portion 51 of the lower chassis 50 (S10). The reflective sheet 40 may be fixed to the lower chassis 50 with an adhesive, a double-sided tape or the like. Alternatively, the reflective sheet 40 may be fixed to the lower chassis 50 by using the plurality of LED bars 30 without being fixed to the lower chassis 50 with an adhesive or a double-sided tape.

After the reflective sheet 40 is disposed on the lower chassis 50, the plurality of LED bars 30 are disposed on the upper surface of the reflective sheet 40 (S20). The plurality of LED bars 30 are spaced apart from each other by a predetermined distance and disposed on the upper surface of the reflective sheet 40 in parallel with each other as illustrated in FIG. 4.

The plurality of LED bars 30 may be fixed to the lower chassis 50 by using fastening members such as bolts and screws. In other words, the fastening member penetrates the reflective sheet 40 to fix the plurality of LED bars 30 to the lower chassis 50.

As another example, the lower chassis 50 may be provided with a plurality of fixing parts capable of fixing the plurality of LED bars 30, so that each of the plurality of LED bars 30 is coupled to each of the plurality of fixing parts in one time operation (e.g., one touch operation).

Finally, the diffusion plate 20 is disposed above the plurality of LED bars 30 (S30). The diffusion plate 20 may be supported by a plurality of support members provided on the lower chassis 50. The plurality of support members may be disposed on the reflective sheet 40. Alternatively, the plurality of support members may be disposed on the printed circuit boards 31 of the LED bars 30 provided on the reflective sheet 40.

As described above, in the direct type backlight device 10 according to an embodiment, after disposing the reflective sheet 40 on the lower chassis 50, the plurality of LED bars 30, 30' and/or 30" are disposed on or over the reflective sheet 40. Therefore, it is not necessary to form the through holes in the reflective sheet 40.

Therefore, when assembling the direct type backlight device 10, there is no operation of inserting the plurality of LEDs into the through holes of the reflective sheet 40. Accordingly, the assembly of the direct type backlight device 10 may be simple.

Therefore, the productivity of the direct type backlight device according to an embodiment is improved compared to the related art direct type backlight device, and the manufacturing cost of the direct type backlight device and a display apparatus having the same may be reduced.

In the direct type backlight device according to an embodiment having the above-described structure, because the plurality of LED bars are disposed on or over the reflective sheet, there is no need for a process in which a plurality of LEDs are inserted into a plurality of through holes of the reflective sheet, as is required in the related art direct type backlight device. Therefore, because the assembly of the direct type backlight device is simple, the direct type backlight device according to an embodiment and a display apparatus having the same are improved in productivity and manufacturing cost.

Although a few embodiments have been shown and described, it would be appreciated by those skilled in the art that changes may be made in embodiments without departing from the principles and spirit of the disclosure, the scope of which is defined in the claims and their equivalents.

What is claimed is:

1. A direct type backlight device comprising:
a lower chassis;
a reflective sheet disposed on a bottom portion of the lower chassis; and
a plurality of light emitting diode (LED) bars disposed on an upper surface of the reflective sheet,
wherein each LED bar of the plurality of LED bars comprises:
a bar-shaped printed circuit board disposed on the upper surface of the reflective sheet;
a plurality of LEDs disposed on an upper surface of the printed circuit board; and
a reflective member provided on the upper surface of the printed circuit board,
wherein the reflective member comprises a photo solder resist (PSR) layer having a high reflectance, the PSR layer being formed by applying a PSR ink to the printed circuit board,
wherein the plurality of LEDs are fixed to the printed circuit board, on which the PSR layer has been provided, via a reflow soldering process performed twice on the printed circuit board, including the PSR layer, and the plurality of LEDs, and
wherein a reflectance of the PSR layer reduces each time after the reflow soldering processing is performed on the PSR layer, and the PSR ink has a reflectance such that the reflectance of the PSR layer, on which the reflow soldering processing has been performed twice, is at least 90% of a reflectance of the reflective sheet, and is less than the reflectance of the reflective sheet.

2. The direct type backlight device as claimed in claim 1, wherein the reflectance of the PSR layer is 87% or more.

3. A display apparatus comprising:
a liquid crystal panel;
a diffusion plate disposed under the liquid crystal panel;
a plurality of light emitting diode (LED) bars disposed under the diffusion plate;
a reflective sheet disposed under the plurality of LED bars; and
a lower chassis disposed under the reflective sheet and configured to support the reflective sheet,
wherein each LED bar of the plurality of LED bars comprises:
a bar-shaped printed circuit board disposed over the reflective sheet;
a plurality of LEDs disposed on an upper surface of the printed circuit board; and
a reflective member provided on the upper surface of the printed circuit board,
wherein the reflective member comprises a photo solder resist (PSR) layer having a high reflectance, the PSR layer being formed by applying a PSR ink to the printed circuit board,
wherein the plurality of LEDs are fixed to the printed circuit board, on which the PSR layer has been provided, via a reflow soldering process performed twice on the printed circuit board, including the PSR layer, and the plurality of LEDs, and
wherein a reflectance of the PSR layer reduces each time after the reflow soldering processing is performed on the PSR layer, and the PSR ink has a reflectance such that the ft reflectance of the PSR layer, on which the reflow soldering processing has been performed twice, is 90% or more of a reflectance of the reflective sheet, and is less than the reflectance of the reflective sheet.

4. The display apparatus as claimed in claim 3, wherein the reflectance of the PSR layer is 87% or more.

* * * * *